United States Patent [19]

Tervamäki et al.

[11] Patent Number: 4,995,432
[45] Date of Patent: Feb. 26, 1991

[54] DOSAGE EQUIPMENT

[75] Inventors: Jukka Tervamäki, Helsinki; Mauno Heinonen; Matti Priha, both of Vantaa; Juha Koivisto, Helsinki, all of Finland

[73] Assignee: Labsystems Oy, Helsinki, Finland

[21] Appl. No.: 265,876

[22] PCT Filed: Feb. 17, 1988

[86] PCT No.: PCT/FI88/00024
§ 371 Date: Oct. 13, 1988
§ 102(e) Date: Oct. 13, 1988

[87] PCT Pub. No.: WO88/06138
PCT Pub. Date: Aug. 25, 1988

[30] Foreign Application Priority Data
Feb. 20, 1987 [FI] Finland .................. 870733

[51] Int. Cl.⁵ .................. F04B 43/12; G01N 1/14
[52] U.S. Cl. .................. 141/130; 417/474; 128/DIG. 12
[58] Field of Search .................. 417/474–477; 141/67, 130, 156, 163; 422/63, 81, 82; 604/153; 128/DIG. 12

[56] References Cited
U.S. PATENT DOCUMENTS

| 2,483,924 | 10/1949 | Moulinier | 417/477 X |
| 3,403,631 | 10/1968 | Tangeman | 417/475 |
| 3,740,173 | 6/1973 | Natelson | 417/475 |
| 4,039,286 | 8/1977 | Keller et al. | 141/130 |
| 4,105,137 | 8/1978 | Bernet et al. | 422/64 |
| 4,537,561 | 8/1985 | Xanthopoulos | 417/477 |
| 4,673,334 | 6/1987 | Allington et al. | 417/475 |
| 4,685,902 | 8/1987 | Edwards et al. | 604/153 |
| 4,824,339 | 4/1989 | Bainbridge et al. | 417/477 |

FOREIGN PATENT DOCUMENTS
0107440 5/1984 European Pat. Off.
0160388 11/1985 European Pat. Off.

Primary Examiner—Henry J. Recla
Assistant Examiner—Casey Jacyna
Attorney, Agent, or Firm—Hopgood, Calimafde, Kalil, Blaustein & Judlowe

[57] ABSTRACT

Dosage equipment, which includes a peristaltic pump for the dosage of liquid. The set of hoses (17) of the peristaltic pump includes an upper piece (18) and a lower piece (19). The body of the pump includes an attaching piece (13), to which the upper piece and the lower piece can be attached.

16 Claims, 3 Drawing Sheets

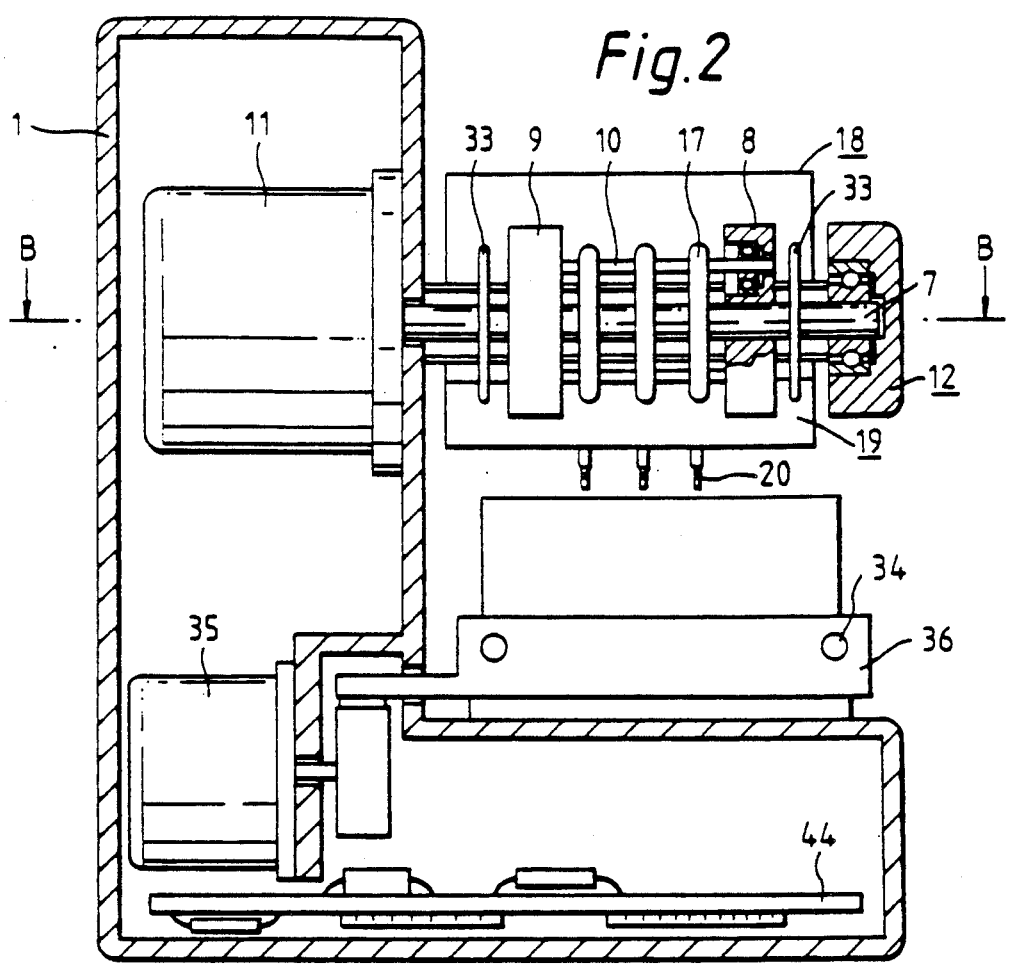
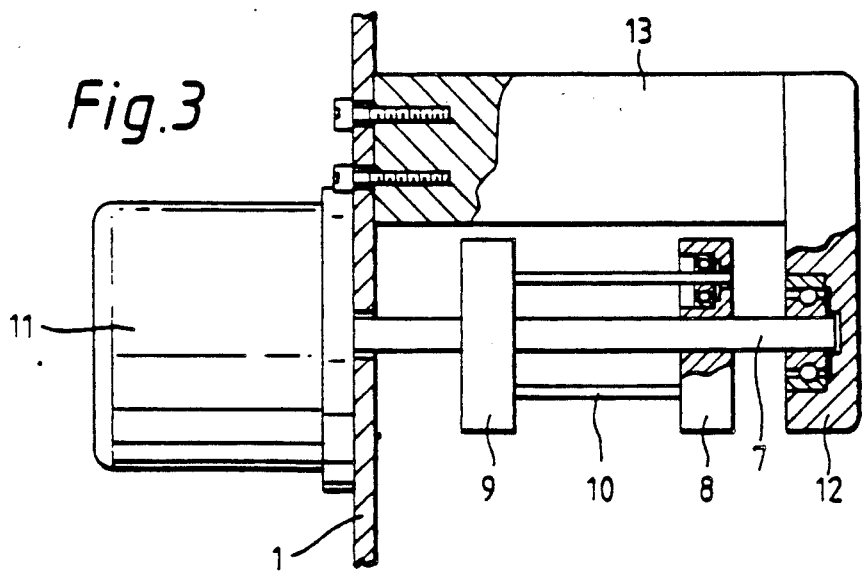

DOSAGE EQUIPMENT

The invention concerns a liquid dosage equipment provided with a peristaltic pump. By its means, liquid is dosed into a group of vessels displaceable relative the nozzles of the peristaltic pump. The equipment can be used in particular in laboratories in various systems of analysis.

BACKGROUND OF THE INVENTION

Peristaltic pumps have been used commonly for transfer of liquids in applications in which the requirements of accuracy of the dose quantities are not so high.

The use of a peristaltic pump in precise dosage apparatuses has been made difficult by factors related, e.g., to the elasticity properties of the hoses and to the rotor speed and acceleration, which cause differences between the doses, in particular if the pump stands periods of different lengths between the times of use.

SUMMARY OF THE INVENTION

Now a dosage equipment provided with a peristaltic pump has been invented which includes a peristaltic pump with a detachable set of hoses in the form of a cassette with means for attaching the set of hoses. The means of attaching comprise attachment pieces or elements provided on the set of hoses and corresponding which cooperate with attachment means provided on the body of the pump. Further, the dosage equipment includes a carriage displaceable relative the peristaltic pump, the liquid being dosed into the vessels provided on the said carriage. The attaching means are preferably so-called fast-coupling or locking means.

The ends of the attachment pieces for the hoses comprising the cassette are preferably interconnected by means of an unstretchable means, such as yarn or filament in order to prevent detrimental tensioning of the hoses similar to a hinge.

According to an embodiment, the end portions of the cassette supporting the set of hoses is provided with locking means e.g., cams pointing at the hoses, and the fastening piece or means on the body is provided with a locking groove for lockingly engaging said cams.

The tension of the hoses should preferably be made adjustable, and most appropriately so that the tension of each hose can be adjusted individually.

BRIEF DESCRIPTION OF THE INVENTION

An embodiment of the invention will be illustrated in more detail with the aid of the accompanying drawings, wherein FIG. 1 is a schematical front view of the whole apparatus partly in section, FIG. 2 shows section A—A in FIG. 1 as enlarged, FIG. 3 is a partial sectional view B—B in FIG. 2 without showing the cassette of hoses, FIG. 4 shows a detached cassette of hoses for the apparatus, and FIG. 5 shows the section C—C in FIG. 4.

DESCRIPTION OF A PREFERRED EMBODIMENT

Figure 1:
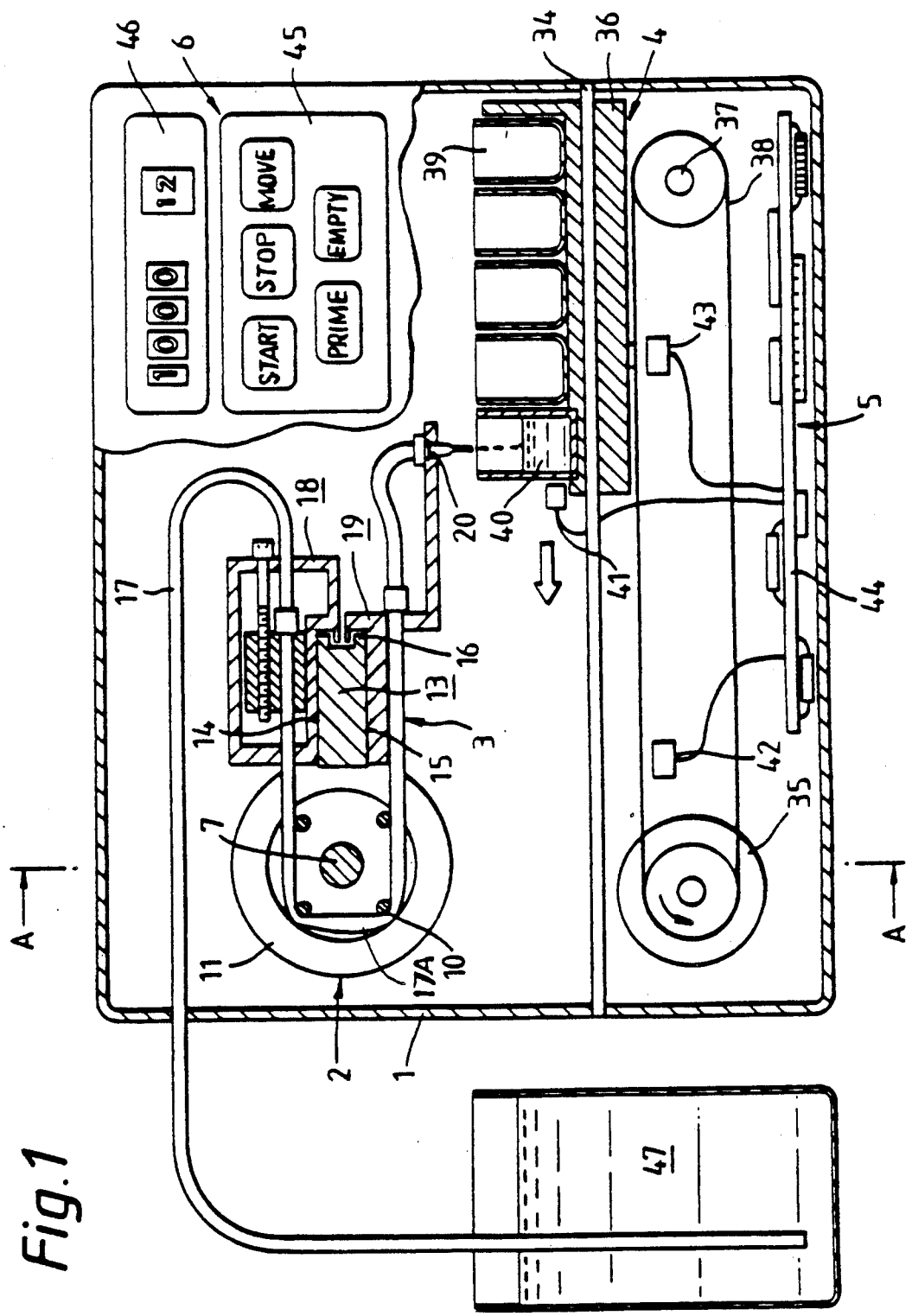

The main parts of the apparatus are the stationary part 2 of the peristaltic pump, the detachable hose cassette 3 of the pump comprising two cooperatively associated pieces 18, 19, the displaceable vessel carriage 4 with its conveyor means 38, a built-in steering equipment 5, and a control equipment 6, all of them fitted in a frame 1.

The peristaltic pump includes a rotor, which consists of a rotor shaft 7 as well as of readily revolving journalled shafts 10 fitted outside the rotor shaft 7 axially between end flanges 8 and 9 (FIGS. 2 and 3). The rotor shaft 7 is rotated by means of a stepping motor 11. The other end of the rotor shaft 7 is journalled in the body piece 12 of the pump.

The body piece 12 further includes a counter-piece 13, attached to the frame side of the rotor (FIG. 3), for fastening the hose cassette. The counter-piece has a plane upper face 14 and a plane lower face 15 about which upper and lower pieces 18 and 19 are cooperatively fitted, the counterpiece 13 having a locking groove 16 opening perpendicularly away from the rotor shaft for releasably receiving cams 24, 30 of elements 19 and 18, respectively.

The hose cassette includes three hoses 17 made of an elastic material, which are attached to the upper piece 18 and to the lower piece 19 so that the hose portions can be tensioned as a loop 17A around journalled shafts 10 and between the said pieces.

Figure 5:
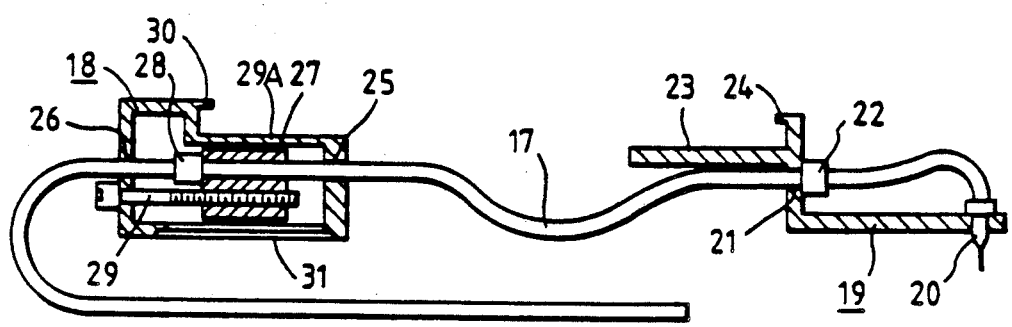

On the lower piece 19, the ends of the hoses 17 are attached to nozzles 20 that open downwards. At the lower piece, the hoses are passed through holes 21 (FIG. 5). Gliding of the hoses away from the lower piece towards the upper piece is prevented by means of limiters 22 attached to the hoses. The lower piece further comprises an upper face 23 (FIG. 5) which rests against the lower face 15 (FIG. 1) of the counter-piece as well as a cam 24 resting against the locking groove 16.

Figure 4:
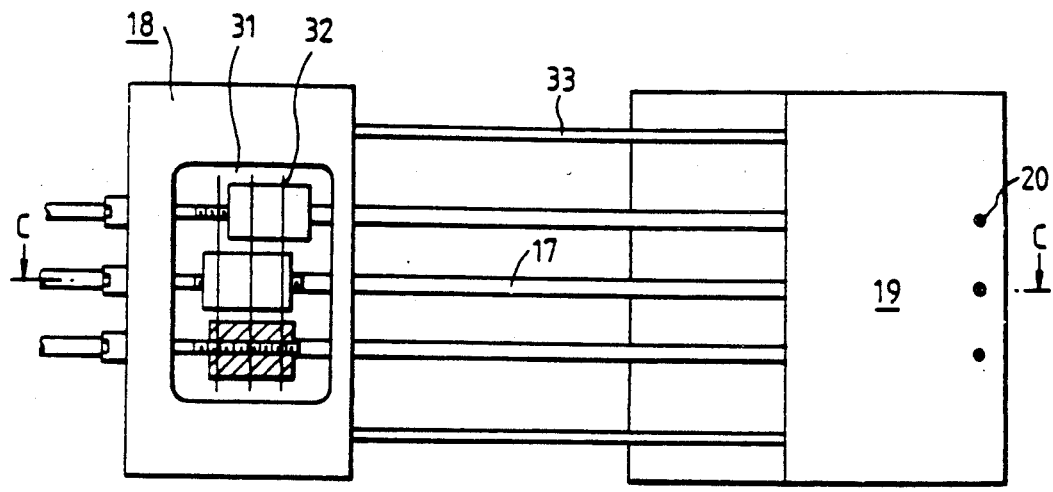

The upper piece 18 is box-like, and at the opposite sides it is provided with through holes 25 and 26 facing each other for the hoses 17 (FIG. 5). Inside the upper piece, the hoses are passed through tensioning pieces 27. The hoses are provided with limiters 28, which prevent gliding of the hoses through the tensioning pieces towards the lower piece 19. In the upper piece 18, the lower or bottom face 29A is made so as to rest against the upper face 14 of the counter-piece 13 (FIG. 1), and it is further provided with a cam 30 releasably coupled to locking groove 16. The location of the tensioning pieces 27 in the direction of the hoses 17 relative the upper piece 18 is adjustable by means of calibration screws 29. The calibration screws are parallel to the hoses, and they revolve freely in the holes in the box with their head outside the box. The threaded part is threaded into the bore provided in the tensioning piece. The upper face of the upper piece is further provided with a transparent window 31 (FIG. 4) with graduation marks 32, by means of which the position of the tensioning pieces can be monitored.

The upper piece 18 and the lower piece 19 are interconnected by two unstretchable yarns 33 parallel to the hoses 17. The lengths of the yarns have been chosen so that they barely permit locking of the upper and the lower piece on the counter-piece 13 so that the hoses are tensioned around the rotor. Owing to the yarns, it is, however, not possible to stretch the hoses unnecessarily, thereby causing deformations that change the pumping volume in the hoses.

In the pump, it is possible to use hose cassettes of different hose numbers and dosage volumes.

The vessel carriage moves below the nozzles 20 along rails 34 parallel to the hoses 17. The carriage is displaced by means of a stepping motor 35 (FIGS. 1 and 2), whose shaft rotates an endless belt 38, which is attached to the carriage frame 36 and which runs over the shaft 37.

On the carriage 36, vessels 39 are placed in rows perpendicular or lateral to the direction of movement. Each row has a vessel facing each nozzle 20.

Further, at the initial end of the carriage 36, there is a bleeding vessel 40 of a width equal to the width of a row of vessels. The vessel is attached to the carriage by means of a T-slot joint in the lateral direction, and thereby it can be easily removed and replaced. The pump is programmed so as to dose into the bleeding vessel once before the beginning of the dosage proper. In this way it is made sure that there is no air in the hoses 17 and that the tension in the hoses has been stabilized to the level of the accelerations caused by normal operation. A detector 41 senses if the bleeding vessel is in its position on the carriage and gives a signal thereof to the steering system of the apparatus.

In view of identifying the location of the carriage, the frame of the apparatus is provided with detectors 42 and 43.

The detectors 41, 42 and 43 may be either mechanical, optical, capacitive, or magnetic. The detectors are connected to the electronics card 44 of the steering system. By means of the steering system, the dosage takes place automatically in accordance with the starting values and commands given.

The necessary starting values and commands are given by means of the knobs 45 and controls 46 in the control equipment.

FIG. 1 also shows the vessel 47 containing the liquid to be dosed, into which the free ends of the hoses 17 have been submerged.

When dosage is started, a cassette of the desired sort is placed into the pump and the ends of the hoses are submerged into vessel 47 containing the liquid to be dosed. Dosage vessels of desired sort and the bleeding vessel are placed in their correct locations on the carriage. The dosage volume is adjusted to the desired level, and the initial commands are given to the apparatus. Hereupon the steering system checks that the bleeding vessel is in its place and that the carriage is in its starting location, wherein the bleeding vessel is placed below the nozzles. Then, the first dose is dosed into the bleeding vessel, and the carriage is shifted one step at a time while dosing the prescribed doses row by row into the vessels. The steering system identifies when the carriage has reached its opposite extreme position, and thereat stops the dosage.

Naturally, within the scope of the invention, the apparatus can be modified from the above.

Thus, in particular the shapes of the pieces of the hose cassette and of the pump attaching pieces may vary. It is, however, preferable that the fastening is a so-called fast coupling, wherein the cassette can be placed in its position by just lightly tensioning the hoses. The fastening piece may also be placed elsewhere on the body piece of the pump, for example facing the end of the rotor.

The carriage track may also be made such that along the track vessel carriages can be transported continuously through the apparatus.

In principle, it is also possible to use a stationary carriage and a displaceable pump.

What is claimed is:

1. A dosage equipment for feeding liquid doses to a plurality of receiving vessels which comprises:

a frame 1,
a peristaltic pump having a stationary part 2 including a stepping motor 11 mounted on said frame 1 and having a motor shaft 7 extending therefrom,
a body piece 12 spaced from said motor and fixed with respect to said frame 1,
said shaft 7 being journalled to said body piece 12,
said peristaltic pump having a two-part hose cassette 3 cooperatively associated therewith,
a pair of spaced end flanges 8 and 9 fixedly mounted on said shaft 7 between said motor and said body piece 12,
a plurality of revolvable shafts 10 spaced about motor shaft 7, each being journalled to said pair of spaced apart end flanges 8 and 9
a counter-piece 13 mounted on said frame 1 and connected to said body piece 12 to fixedly secure said body piece with respect to motor shaft,
said counter-piece further being adapted to support said two-part hose cassette,
said two-part hose cassette 3 comprising cooperatively associated upper part 18 and a lower part 19 connected along adjacent sides thereof solely by unstretchable strands 33 such that the two parts 18, 19 fit together about and are supported by said counter-piece 13,
said counter-piece 13 including a free end and having means for engaging with locking means on said upper and lower parts 18, 19 for cooperatively holding said upper and lower parts about said counter-piece 13,
a plurality of spaced-apart elastic hoses 17 passing continuously through said upper and lower parts 18, 19 and providing a loop 17A thereof outside said upper and lower parts for passing around said revolvable shafts 10 in tension engagement therewith to compress said hose and maintain said upper and lower parts in contact with said counter-piece 13,
a set of receiving vessels 39 arranged to receive dosed liquid therein,
each of said hoses 17 being connectable to a source of liquid to be dosed and having a nozzle 20 at one end for feeding dosed liquid to said receiving vessels 39; and
a carriage 36 supporting said vessels 39 and displaceable relative to said peristaltic pump and located beneath said nozzles 20.

2. The dosage equipment as in claim 1 wherein said strands 33 are unstretchable and of sufficient length to permit tensioning of hoses 17 when said cassette 3 is attached to counter-piece 13 when said hoses 17 are wound about revolvable shafts 10 via loop 17A.

3. The dosage equipment as in claim 2, wherein the number of connecting strands 33 is at least two.

4. The dosage equipment as in claim 3, wherein the engaging means on the free end of said counter-piece 13 is a groove 16 which cooperates with locking means on said upper and lower parts 18, 19, said locking means comprising locking cams 24 and 30 on said upper and lower parts 18, 19.

5. The dosage as in claim 4, wherein the upper part 18 is provided with tension adjusting means 27, 28 and 29 for adjusting tension on hoses 17.

6. The dosage equipment as in claim 5, wherein tensioning means 27 with screw 29 therein is adapted to move along and within upper part 18 via screw 29 against limiter 28 to adjust tension on hoses 17.

7. The dosage equipment as in claim 6, wherein tension adjusting means 27, 28 and 29 located within upper part 18 also includes a window 31 located at the bottom of upper part 18 through which the adjustment of said tensioning means can be monitored.

8. The dosage equipment as in claim 1, wherein said deplaceable carriage 36 includes a bleeding vessel 40 into which liquid can be dosed for adjusting the equipment.

9. The dosage equipment as in claim 1, wherein said displaceable carriage 36 located below said nozzles also contains a bleed vessel 40 together with said plurality of dose-receiving vessels 39, wherein said carriage is actuated by a steering system 5 which is in turn actuated by control means 6, said system also including a stepping motor 3 and an endless belt 38 coupled to said carriage 36 mounted on track 34, the system including detectors 42 and 43 for sensing the location of carriage 36 and detector 41 for sensing the position of said bleeding vessel 40.

10. A dosage equipment for feeding liquid doses to a plurality of receiving vessels which comprises:
a frame 1,
a peristaltic pump having a stationary part 2 including a stepping motor 11 mounted on said frame 1 and having a motor shaft 7 extending therefrom,
a body piece 12 spaced from said motor and fixed with respect to said frame,
said shaft 7 being journalled to said body piece 12, said peristaltic pump having a two-part hose cassette 3 cooperatively associated therewith,
a pair of spaced end flanges 8 and 9 fixedly mounted to said shaft 7 between said motor and said body piece 12,
a plurality of revolvable shafts 10 spaced about said motor shaft 7, each being journalled to said pair of spaced apart end flanges 8 and 9,
a counter-piece 13 mounted on said frame 1 and connected to said body piece 12 to fixedly secure said body piece with respect to said motor shaft 7,
said counter-piece 13 having upper and lower faces 14, 15 against which the two-part cassette is supported, and a groove 16 at its free end for engaging locking means located on said hose cassette,
said two-part hose cassette comprising an upper part 18 and a lower part 19 attached one to the other along adjacent sides thereof solely by unstretchable strands 33 of sufficient length such that said upper and lower parts 18, 19 of said cassettes can be fitted together about said counter-piece 13,
a plurality of spaced-apart elastic hoses 17 passing continuously through said upper and lower parts 18, 19 with each providing a loop 17A thereof outside said upper and lower parts for passing around said revolvable shafts 10 in tension engagement to compress said hoses and maintain said upper and lower parts in contact with said counter-piece 13,
a set of receiving vessels 39 arranged to receive dosed liquid therein,
one end of each hose being connectable to a source of liquid 47 to be dosed and the other end of each thereof being provided with a nozzle 20 used for feeding dosed liquid to said receiving vessels 39; and
a carriage 36 displaceable relative to said peristaltic pump and disposed beneath said nozzles 20, said carriage also containing a bleeding vessel 40 and said plurality of dose receiving vessels 39 for receiving said dose from said nozzles 20.

11. The dosage equipment as in claim 10, wherein the number of connecting strands 33 is at least 2.

12. The dosage equipment as in claim, 10 wherein the upper part 18 is provided with tension adjusting means 27, 28 and 29 for adjusting tension on hoses 17.

13. The dosage equipment as in claim 12, wherein tensioning means 27 with screw 29 therein is adapted to move along and within upper part 18 via screw 29 against limiter 28 to adjust tension on hoses 17.

14. The dosage equipment as in claim 13, wherein tension adjusting means 27, 28 and 29 located within upper part 18 also includes a window 31 located at the bottom of upper part 18 through which the adjustment of said tensioning means can be monitored.

15. The dosage equipment as in claim 10, wherein said displaceable carriage 36 includes a bleeding vessel 40 into which liquid can be dosed for adjusting the equipment.

16. The dosage equipment as in claim 10, wherein said displaceable carriage 36 located below said nozzles 20 contains a bleed vessel 40 together with said plurality of dose-receiving vessels 39, wherein said carriage is actuated by control means 6, said system also including a stepping motor 35 and an endless belt 38 coupled to said carriage 36 mounted on track 34, the system including detectors 42 and 43 for sensing the location of carriage 36 and detector 41 for sensing the position of said bleeding vessel 40.

* * * * *